US007263619B1

(12) United States Patent
Kim

(10) Patent No.: US 7,263,619 B1
(45) Date of Patent: Aug. 28, 2007

(54) METHOD AND SYSTEM FOR ENCRYPTING ELECTRONIC MESSAGE USING SECURE AD HOC ENCRYPTION KEY

(75) Inventor: Chong-Lim Kim, 68 Waltham St., Apt. 2, Boston, MA (US) 02118

(73) Assignee: Chong-Lim Kim, Chestnut Hill, MA (US)

( * ) Notice: Subject to any disclaimer, the term of this patent is extended or adjusted under 35 U.S.C. 154(b) by 572 days.

(21) Appl. No.: 10/606,635

(22) Filed: Jun. 26, 2003

Related U.S. Application Data

(60) Provisional application No. 60/392,223, filed on Jun. 26, 2002, provisional application No. 60/399,334, filed on Jul. 28, 2002.

(51) Int. Cl.
*G06F 1/24* (2006.01)
(52) U.S. Cl. .................. 713/194; 713/193; 713/187
(58) Field of Classification Search ............... 713/194, 713/193, 182
See application file for complete search history.

(56) References Cited

U.S. PATENT DOCUMENTS

| 5,136,646 | A | * | 8/1992 | Haber et al. ................. 713/178 |
| 5,428,795 | A | * | 6/1995 | Johnson et al. ............. 710/240 |
| 5,675,510 | A | * | 10/1997 | Coffey et al. ............... 709/224 |
| 5,696,702 | A | * | 12/1997 | Skinner et al. ............. 702/186 |
| 6,289,105 | B1 | | 9/2001 | Murota |
| 6,307,936 | B1 | | 10/2001 | Ober et al. |
| 2002/0004899 | A1 | | 1/2002 | Azuma |
| 2002/0023213 | A1 | | 2/2002 | Walker et al. |
| 2002/0032861 | A1 | | 3/2002 | Azuma |
| 2002/0053019 | A1 | | 5/2002 | Ruttan et al. |
| 2002/0059144 | A1 | | 5/2002 | Meffert et al. |
| 2002/0076055 | A1 | | 6/2002 | Filipi-Martin et al. |
| 2002/0078354 | A1 | | 6/2002 | Sandhu et al. |

* cited by examiner

*Primary Examiner*—Thomas R. Peeso
(74) *Attorney, Agent, or Firm*—Hamilton, Brook, Smith & Reynolds, P.C.

(57) ABSTRACT

A method and system for encrypting an electronic message to a receiver by utilizing a sender generated ad hoc asymmetric key pair whose private key is encrypted and known only to the sender. The key pair is uniquely associated with both the sender and the receiver and is stored in a key server. A method and system for decrypting an encrypted electronic message by authenticating the receiver to the sender and having the sender retrieve and decrypt the encrypted private key. The above methods and systems utilizing an ad hoc symmetric key instead of an ad hoc asymmetric key pair.

20 Claims, 5 Drawing Sheets ptography.

METHOD AND SYSTEM FOR ENCRYPTING ELECTRONIC MESSAGE USING SECURE AD HOC ENCRYPTION KEY

RELATED APPLICATIONS

This application claims the benefit of U.S. Provisional Application No. 60/392,223, filed Jun. 26, 2002, and U.S. Provisional Application No. 60/399,334, filed Jul. 28, 2002. The entire teachings of the above applications are incorporated herein by reference.

BACKGROUND OF THE INVENTION

Encryption is useful to secure the contents of an electronic message end-to-end during transmission from a sender to a receiver. In asymmetric cryptography, encryption and decryption is done using a public-private key pair. In symmetric cryptography, encryption and decryption is done using one shared key. Symmetric cryptography is much more efficient computationally compared to asymmetric cryptography.

To encrypt a message such as an electronic mail using symmetric encryption, a shared key has to be agreed upon by the sender and the receiver. If both parties are able to authenticate each other, the sender can use a key negotiation protocol with the receiver to set up a secret shared key, but this still requires that the receiver be online at the time the sender needs to create the shared key for encrypting the message to the receiver. Or, the sender can securely distribute the shared key out-of-band to the receiver, but this is often not practical because that step has to be done for every receiver that the sender wishes to communicate with. Furthermore, in situations where the sender sends multiple messages which are received in a batch by the receiver, the secret shared key may be accessed multiple times by the sender, which could increase the chance of the shared key being compromised.

To overcome the above problems, asymmetric cryptography may be employed. To encrypt a message such as an electronic mail, a shared key again may be used to encrypt the message plaintext into ciphertext. In this case however, the shared key itself is encrypted by the sender using the receiver's known public key and sent to the receiver along with the ciphertext. The shared key is decrypted by the receiver using the receiver's corresponding private key. The decrypted shared key is then used by the receiver to decrypt the ciphertext back into the message plaintext.

A public key infrastructure, PKI, has evolved whereby a certificate attached to a public key is used to attest that a particular public key is bound to or associated with a particular party. The certificate is created and digitally signed by a trusted public key certificate authority, CA, using the CA's private key. To digitally sign a certificate (or any message), the CA would calculate a hash function result for the certificate and encrypt the hash result using the CA's private key. The certificate and its encrypted hash result (digital signature) are attached to the public key and given to the receiver claiming ownership of the public-private key pair. The sender obtaining the receiver's public key verifies the digital signature of the certificate on the public key. This is done by decrypting the certificate's hash result using the CA's well-known public key and matching that with the hash function result calculated directly from the certificate.

However, if the receiver has not acquired a public-private key pair or has not publicized his/her public key, the sender is unable to encrypt the message utilizing the receiver's known public key. Acquiring and managing a public-private key pair appear to be too involved or too much bother in many instances, such as for electronic mail. A user has to go through a fairly involved process to generate a public-private key pair, and then another fairly involved process to obtain a certificate for the public key. A user also has to protect the private key from being found out or stolen. Often the public-private key pair is stored on a user's primary computer, which is not accessible when the user is not using the primary computer. When a primary computer is replaced, the public-private key has to be exported from the old primary computer and imported into a new primary computer. Hence receiver acquisition of a public-private key pair and receiver key management are significant impediments and drawbacks. For the above reasons, among others, e-mail message encryption using PKI is not widely adopted in spite of the obvious security advantages.

A key server provides a method for generating and associating a new public-private key pair for a receiver when a public key that is associated with the receiver e-mail address is not known. However, the new private key of the public-private key pair is not cryptographically secure in the key server. Another related problem is that since the new key pair is publicized to be associated with the receiver e-mail address, a compromised private key of the public-private key pair can be used to digitally sign e-mail that is purported to come from the receiver. The receiver also may not want a public-private key pair that is generated by another party (i.e. sender) to be universally associated with the receiver e-mail address.

SUMMARY OF THE INVENTION

This invention relates to generating and using cryptographically secure ad hoc encryption keys to encrypt and decrypt electronic messages.

An object of the present invention is to allow a sender to generate an ad-hoc public-private key pair whose private key is known only to the sender in order to encrypt an e-mail message to a receiver without the receiver's involvement, when there is no known receiver public key for the sender to use, or the receiver is not online to participate in a key negotiation protocol to set up a shared key with the sender, or an out-of-band shared key distribution between the sender and the receiver is not practical, or it is more secure for the sender to be able to use a public key instead of accessing a stored secret shared key to encrypt the sender's multiple messages.

Another object of the present invention is for the ad-hoc public-private key pair generated by the sender without the receiver's involvement not to be universally associated with the receiver e-mail address.

A sender desiring to encrypt an electronic message prior to sending to a receiver generates an ad-hoc public key and private key asymmetric key pair that is uniquely associated with both the sender and the receiver; encrypts the private key, the private key known only to the sender; creates an index value that is uniquely associated with the key pair, the index value utilized for key retrieval; stores in a key server at least the encrypted private key together with the associated index value; and encrypts, the electronic message by utilizing the public key. In an alternative embodiment, the private key is encrypted symmetrically by utilizing a sender secret. In another embodiment, the index value is known only to the sender. In an alternative embodiment, an identity value is obtained by utilizing at least a unique identification for the sender and a unique identification for the receiver, and the index value is computed from the identity value by utilizing a sender secret. In another embodiment, the electronic message is an electronic mail message. In another embodiment, the key pair is a set of at least one key pair, each key pair associated with a validity field. In yet another embodiment, the ad hoc public key and private key asymmetric key pair is an ad hoc symmetric key.

A receiver desiring to decrypt an encrypted electronic message received from a sender authenticates the receiver to the sender; derives an index value that is uniquely associated with an ad hoc public key and private key asymmetric key pair, the key pair uniquely associated with both the sender and the receiver; retrieves an encrypted private key from a key server by utilizing the index value, the private key known only to the sender; and decrypts the encrypted electronic message by utilizing the encrypted private key. In an alternative embodiment, an unencrypted private key is obtained from the encrypted private key by utilizing a sender secret, and the encrypted electronic message is decrypted by utilizing the unencrypted private key. In another embodiment, the index value is known only to the sender. In an alternative embodiment, an identity value is obtained by utilizing at least a unique identification for the sender and a unique identification for the receiver, and the index value is computed from the identity value by utilizing a sender secret. In another embodiment, the electronic message is an electronic mail message. In another embodiment, the key pair is a set of at least one key pair, each key pair associated with a validity field, and an encrypted private key is retrieved and utilized for decrypting the encrypted electronic message, the encrypted private key selected from the set based on the associated validity field. In yet another embodiment, the ad hoc public key and private key asymmetric key pair is an ad hoc symmetric key.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Encrypting Electronic Message

Figure 1:
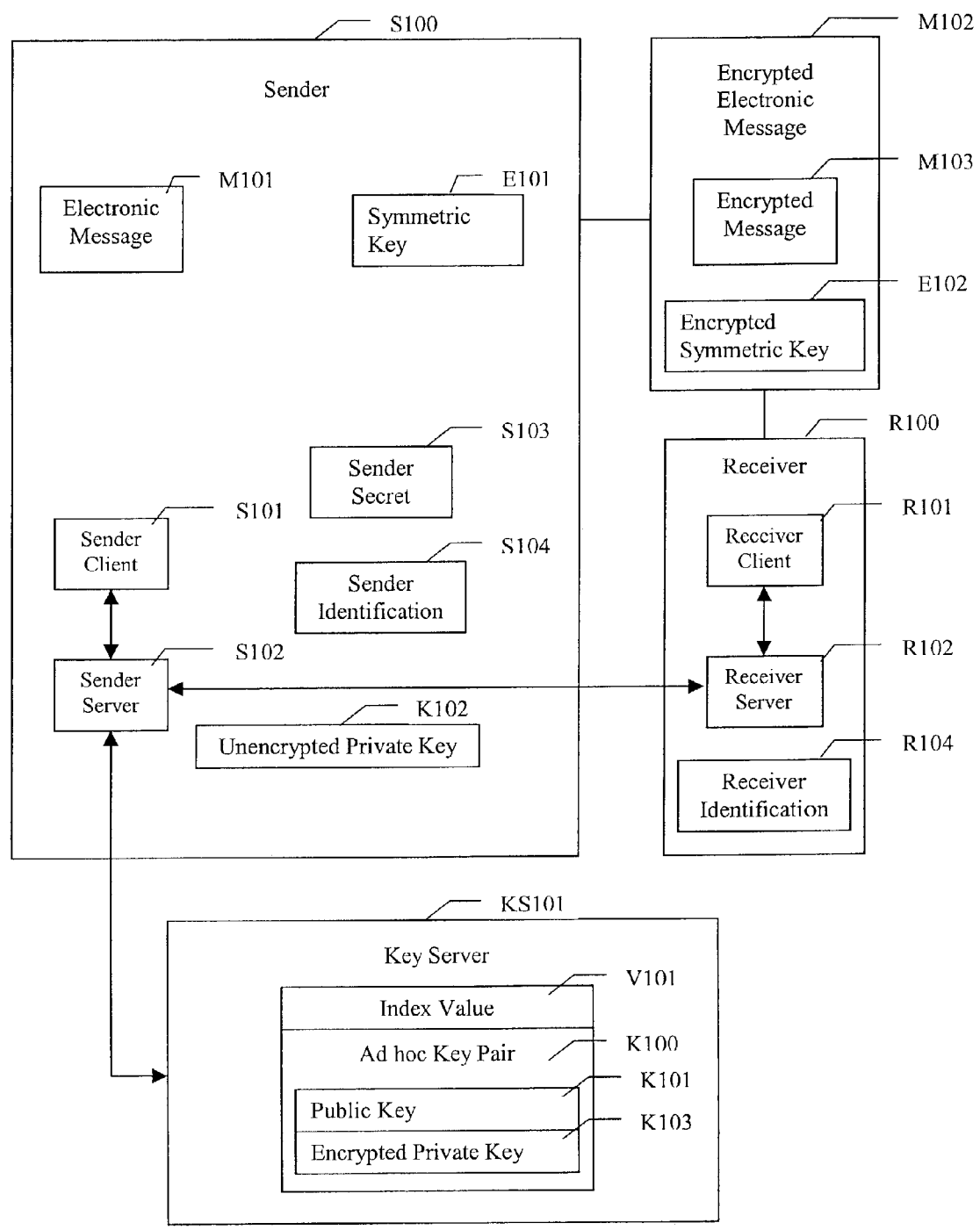
FIG. 1 is a block diagram of a system for encrypting an electronic message according to the principles of present invention.

FIG. 1 is a block diagram of a system for encrypting an electronic message according to the principles of the present invention. Referring to FIG. 1, a sender S100 wishes to encrypt an electronic message M101, such as an electronic mail or e-mail, to a receiver R100, but does not have a public key to use for receiver R100. In one embodiment, a sender client S101 authenticates itself to sender server S102 utilizing for example Challenge Handshake Authentication Protocol (CHAP) as described in the Internet Engineering Task Force (IETF) Request For Proposal (RFC) 1994, One-Time Password as described in RFC 1938, token card, Secure Remote Password Protocol (SRP) as described in RFC 2945, etc. Sender client S101 sets up a secure channel to sender server S102, using a secret session key negotiated with sender server S102 utilizing a secure key negotiation protocol based on Diffie-Hellman. In another embodiment, Transport Layer Security (TLS) protocol as described in RFC 2246 and RFC 3546 can be used for authentication and setting up a secure channel between sender client S101 and sender server S102. Sender client S101 securely sends e-mail electronic message M110 to sender server S102.

Figure 2:
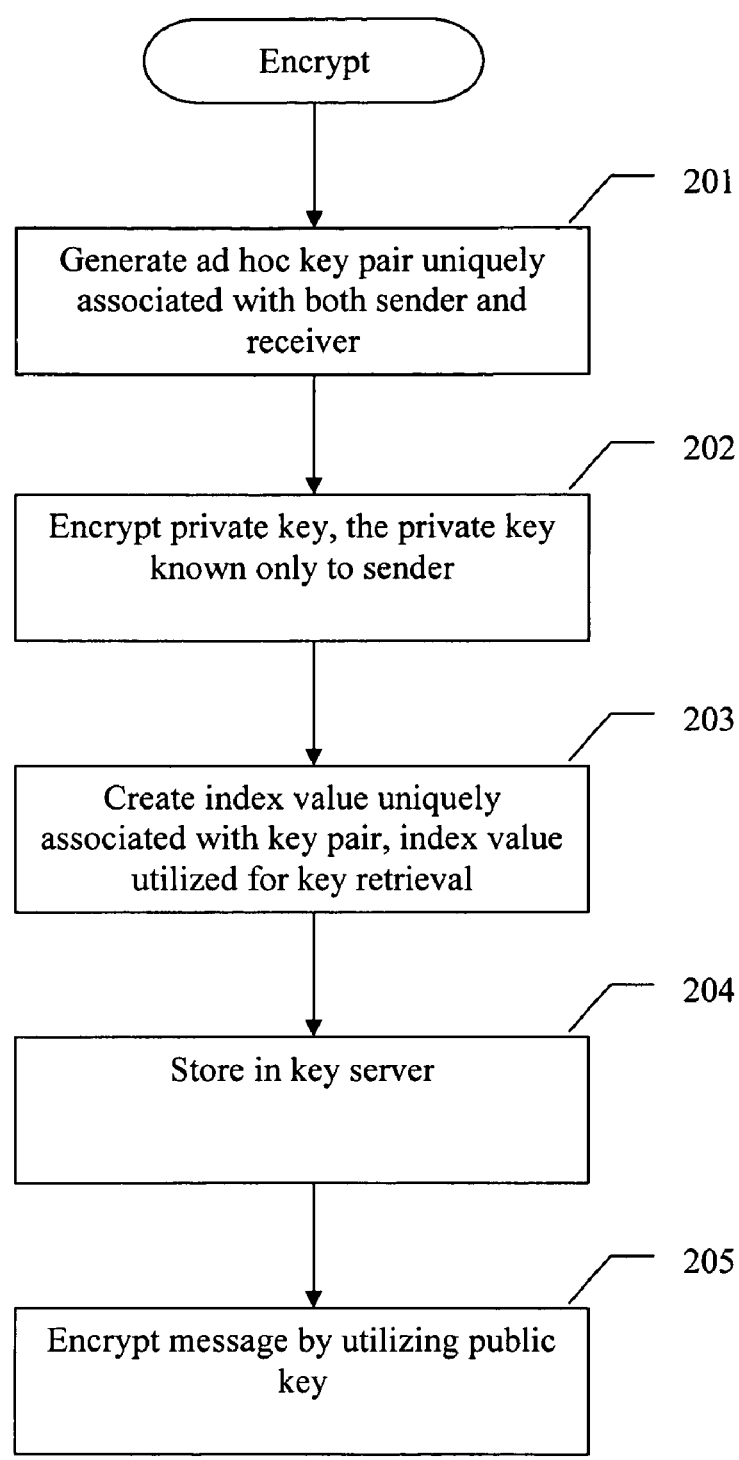
FIG. 2 is a flow diagram of a procedure for encrypting an electronic message according to the present invention.

FIG. 2 is a flow diagram of a procedure for encrypting an electronic message according to the present invention. Referring to FIG. 2, at step 201, sender server S102 generates a new ad hoc asymmetric key pair comprising public key K101 and unencrypted private key K102, uniquely associated with both sender S100 and receiver R100. The size of the keys should be at least 2048–8192 bits for approximately a 128-bit security level.

At step 202, sender server S102 salts and stretches a sender secret S103 passphrase to 256 bits long for approximately a 128-bit security level, for use to encrypt unencrypted private key K102 into an encrypted private key K103, the private key known only to sender S100. The salt used with sender secret S103 passphrase is stored alongside encrypted private key K103. The symmetric encryption functions for encrypting unencrypted private key K102 are as described later below. Public key K101 and encrypted private key K103 make up an ad hoc key pair K100 that is uniquely associated with both sender S100 and receiver R100.

Figure 3:
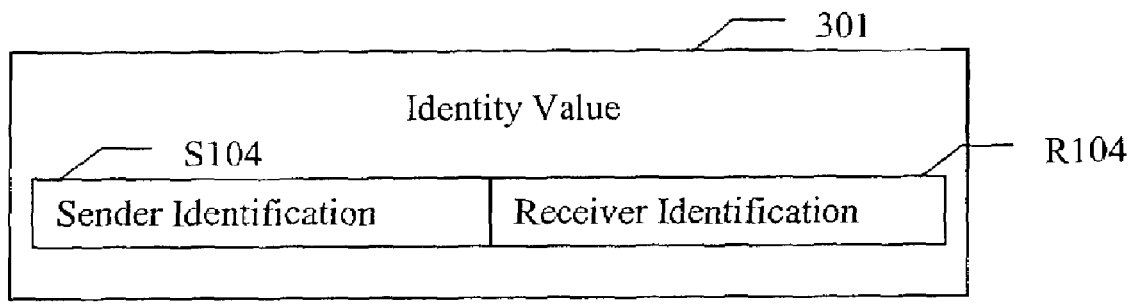
FIG. 3 is a block diagram illustrating an identity value that can be used to compute an index value utilized for key retrieval in one embodiment.

At step 203, sender server S102 creates an index value V101 that is uniquely associated with key pair K100 and is utilized for key retrieval. FIG. 3 is a block diagram illustrating an identity value that can be used to compute an index value utilized for key retrieval in one embodiment. Referring to FIG. 3, index value V101 can be simply an identity value 301 which is obtained from a concatenation of a unique sender identification S104 such as the e-mail address of sender S100, and a unique receiver identification R104 such as the e-mail address of receiver R100. In another embodiment, index value V101 is known only to sender S100, and is computed from a message authentication code (MAC) function, such as HMAC-SHA-256, with two arguments. One argument can be identity value 301. The other argument is a salted and stretched sender secret S103 passphrase.

Sender server S102 authenticates itself to key server KS101 utilizing for example PKI digital signature. Sender server S102 sets up a secure channel to key server KS101, using a secret session key negotiated with key server KS101 utilizing a secure key negotiation protocol based on Diffie-Hellman. In another embodiment, Transport Layer Security (TLS) protocol can be used for authentication and setting up a secure channel between sender server S102 and key server KS101.

At step 204, sender server S102 securely stores in key server KS101 index value V101, public key K101, and encrypted private key K103.

Figure 4:
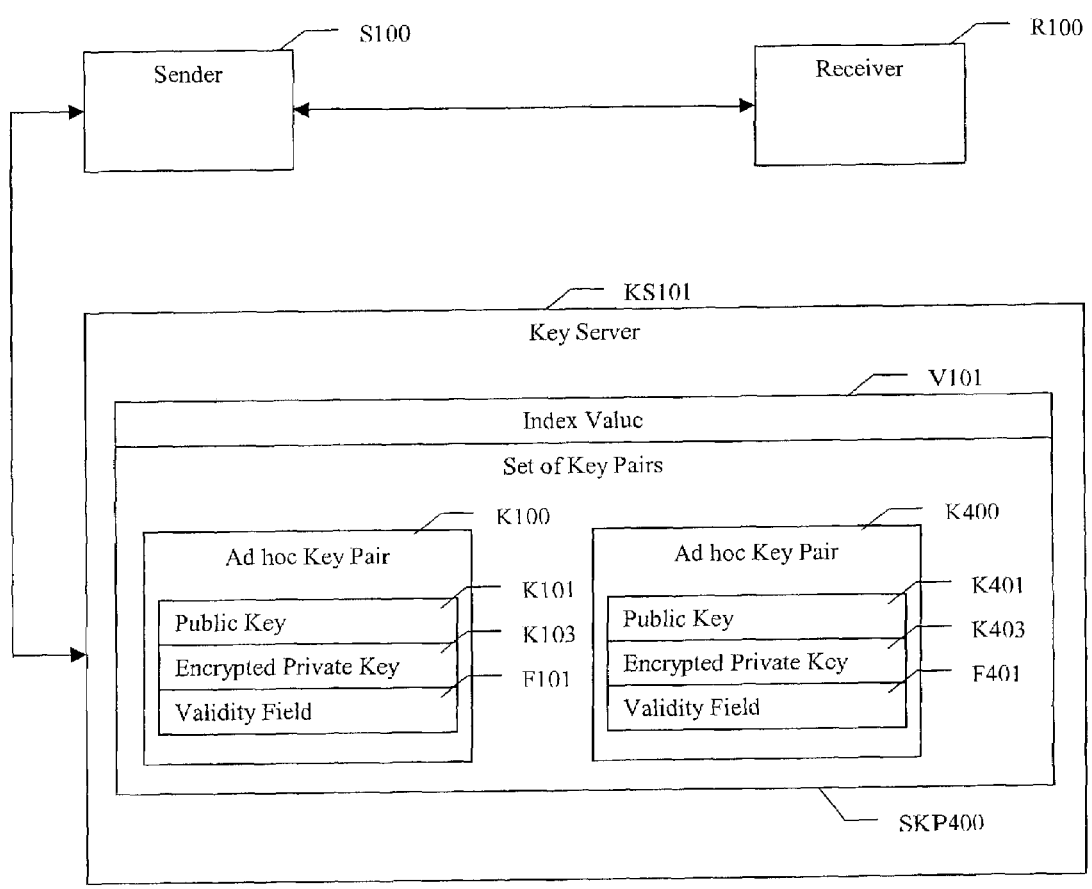
FIG. 4 is a block diagram illustrating a set of key pairs with validity fields.

In another embodiment, key server KS101 stores index value V101 together with a set of key pairs. Each key pair is associated with a validity field such as a date stamp or a validity period. FIG. 4 is a block diagram illustrating a set of key pairs with validity fields. Referring to FIG. 4, sender server S102 generates, encrypts and stores a new ad hoc key pair K400 comprising a public key K401, an encrypted private key K403 and a validity field F401. Key pair K400 is used for encrypting new messages from sender S100 to receiver R100 after expiration of a validity field F101 associated with ad hoc key pair K100. Expired key pair K100 is still stored in key server KS101 to be utilized for decrypting prior messages from sender S100 to receiver R100. A set of key pairs SKP400 comprising key pair K100 and key pair K400 is uniquely associated with both sender S100 and receiver R100. Index value V101 is uniquely associated with the set of key pairs SKP400.

In another embodiment, key server KS 101 or other components of the system may charge a fee for access. In yet another embodiment, key server KS101 may be distributed over several key servers for redundancy, or may be implemented as a web service.

At step 205, sender server S102 encrypts e-mail electronic message M101 into an e-mail encrypted message M103 using a symmetric key E101, which is in turn encrypted into an encrypted symmetric key E102 by sender server S102 using asymmetric public key K101. Symmetric encryption functions that can be used include the counter (CTR) mode or the cipher block chaining (CBC) mode for the Rijndael cipher or the Twofish cipher. Rijndael is the Advanced Encryption Standard (AES) of the U.S. government. The size of symmetric key E101 should be at least 256-bit for approximately a 128-bit security level, which means that any attack will require approximately $2^{12}$ steps; In an alternate embodiment, symmetric key E101 is chosen to be h(r) for some hash function h and a random $r \in Z_n$ where (n, e=5) is public key K101, and r is encrypted into encrypted symmetric key E102 by raising r to the fifth power modulo n, as described on page 237 of Niels Ferguson and Bruce Schneier, *Practical Cryptography*, Wiley Publishing, Inc., Indianapolis, 2003.

In another embodiment, instead of a new ad hoc asymmetric key pair, a new ad hoc symmetric key with size and for symmetric encryption functions as described above is generated by sender server S102. The symmetric key is uniquely associated with both sender S100 and receiver R100, encrypted and known only to sender S100 as described above, stored in key server KS101 with index value V101 used for key retrieval as described above, and used directly to encrypt electronic messages to receiver R100.

Sender server S102 sends an encrypted electronic message M102 comprising encrypted symmetric key E102 and e-mail encrypted message M103 to a receiver server R102 through an insecure channel. If sender server S102 and receiver server R102 act as mail transfer agents, the Simple Mail Transfer Protocol (SMTP) can be used to transfer encrypted electronic message M102 as a multi-part e-mail. Sender server S102 sends public key K101 for local storage in sender client S101 to be utilized in encrypting future messages from sender S100 to receiver R100. In the alternative embodiment where a validity field is associated with key pair K100, public key K101 expires in sender client S101 when key pair K100 expires.

Decrypting Electronic Message

Figure 5:
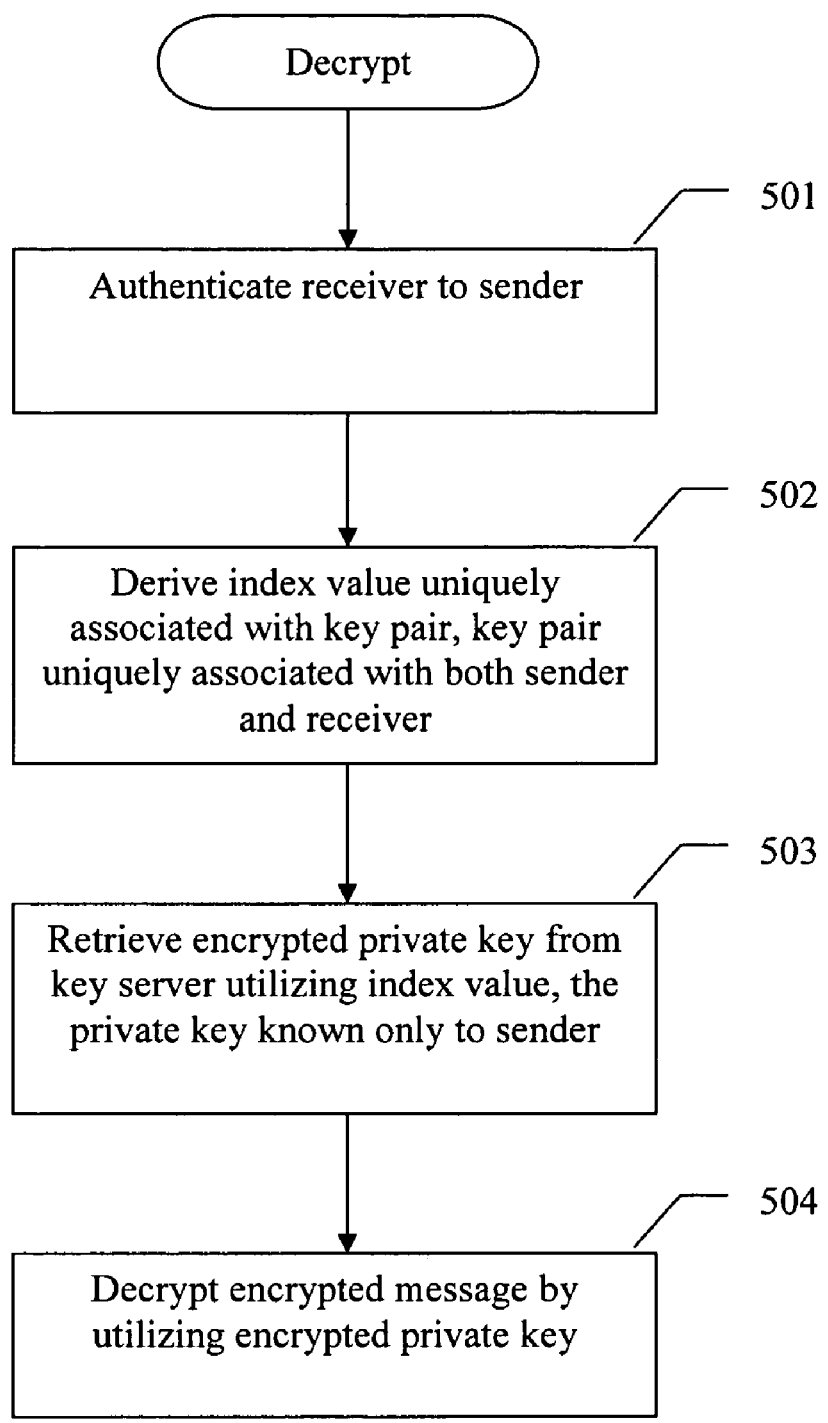
FIG. 5 is a flow diagram of a procedure for decrypting an electronic message according to the present invention.

Referring to FIG. 1, receiver R100 wishes to decrypt encrypted electronic message M102 from sender S100, but does not have a corresponding private key to use for decryption. FIG. 5 is a flow diagram of a procedure for decrypting an electronic message according to the present invention. Referring to FIG. 5, at step 501, receiver R100 authenticates itself to sender S100. In one embodiment, a receiver client R101 authenticates itself to receiver server R102 utilizing for example Challenge Handshake Authentication Protocol (CHAP), One-Time Password, token card, Secure Remote Password Protocol (SRP), etc. Receiver client R101 sets up a secure channel to receiver server R102, using a secret session key negotiated with receiver server R102 utilizing a secure key negotiation protocol based on Diffie-Hellman. In another embodiment, Transport Layer Security (TLS) protocol can be used for authentication and setting up a secure channel between receiver client R101 and receiver server R102. Receiver server R102 in turn authenticates itself to sender server S102 utilizing for example PKI digital signature, which completes the authentication of receiver R100 to sender S100.

Receiver server R102 sets up a secure channel to sender server S102, using a secret session key negotiated with sender server S102 utilizing a secure key negotiation protocol based on Diffie-Hellman. Sender server S102 authenticates itself to key server KS101 utilizing for example PKI digital signature. Sender server S102 sets up a secure channel to key server KS101, using a secret session key negotiated with key server KS101 utilizing a secure key negotiation protocol based on Diffie-Hellman. In another embodiment, TLS protocol can be used for authentication and setting up a secure channel between receiver server R102 and sender server S102, or between sender server S102 and key server KS101.

At step 502, sender server S102 derives an index value V101 from identity value 301, as previously described above, that is uniquely associated with key pair K100, key pair K100 being uniquely associated with both sender S100 and receiver R100. In another embodiment, index value V101 is known only to sender S100, and is derived from a MAC function with identity value 301 as one argument, and salted and stretched sender secret S103 passphrase as the other argument, as previously described above.

At step 503, sender server S102 retrieves via secure channel encrypted private key K103 that is stored in key server KS101 by using index value V101, the private key known only to sender S100.

In the alternative embodiment where a validity field is associated with a key pair, referring to FIG. 4, key server KS101 serves up set of key pairs SKP400 comprising key pair K100 and key pair K400 associated with index value V101. Sender server S102 selects the correct encrypted private key K403 based on the date of encrypted electronic message M102 being within the valid period of validity field F401 for key pair K400.

In another embodiment, key server KS101 or other components of the system may charge a fee for access. In yet another embodiment, key server KS101 may be distributed over several key servers for redundancy, or may be implemented as a web service.

At step 504, encrypted electronic message M102 is decrypted in three sub-steps by utilizing encrypted private key K103. Encrypted electronic message M102 comprises encrypted symmetric key E102 and e-mail encrypted message M103. Firstly, sender server S102 salts and stretches sender secret S103 passphrase to decrypt encrypted private key K103 into unencrypted private key K102. The symmetric encryption functions for decrypting encrypted private key K103 are as previously described above. The salt used with sender secret S103 passphrase is stored alongside encrypted private key K103. Receiver server R102 securely obtains unencrypted private key K102 from sender server S102. Secondly, receiver server R102 uses unencrypted private key K102 to decrypt encrypted symmetric key E102 into symmetric key E101. Thirdly, receiver server R102 uses symmetric key E101 to decrypt e-mail encrypted message M103 into e-mail electronic message M101.

In the alternative embodiment where a symmetric key, instead of an asymmetric key pair, is generated, encrypted and stored by sender S100, and used directly to encrypt electronic messages to receiver R100, encrypted electronic message M102 is just e-mail encrypted message M103 and is decrypted in only two sub-steps at step 504, after the encrypted symmetric key is retrieved from key server KS101 at step 503. Firstly, sender server S102 decrypts the encrypted symmetric key into an unencrypted symmetric key, as described above. Receiver server R102 securely obtains the unencrypted symmetric key from sender server S102. Secondly, receiver server R102 uses the unencrypted symmetric key to decrypt e-mail encrypted message M103 into e-mail electronic message M101.

Receiver client R101 uses Post Office Protocol (POP) or Internet Message Access Protocol (IMAP) to obtain e-mail electronic message M101 via secure channel from receiver server R102. Receiver R100 receives decrypted e-mail electronic message M101.

It will be apparent to those of ordinary skill in the art, that methods involved in the present invention may be embodied in a computer program product that includes a computer usable medium. For example, such a computer usable medium can consist of a read only memory device, such as a hard drive or a computer diskette, having computer readable program code stored thereon.

It is understood that the receiver, sender and key server can be separate hardware components and each include a separate processor. Alternatively, the sender and key server can be components in the same system.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method implemented in a processor system for a sender to encrypt an electronic message prior to sending to a receiver, comprising the steps of:
    generating an ad hoc public key and private key asymmetric key pair that is uniquely associated with both the sender and the receiver;
    encrypting the private key, the private key known only to the sender;
    creating an index value that is uniquely associated with the key pair and both the sender and the receiver, the index value utilized for key retrieval;
    storing in a key server at least the encrypted private key together with the associated index value; and
    encrypting the electronic message by utilizing the public key.

2. The method of claim 1 wherein the index value is known only to the sender.

3. The method of claim 2 wherein the creating step comprises the steps of:
    obtaining an identity value by utilizing at least a unique identification for the sender and a unique identification for the receiver; and
    computing from the identity value an index value by utilizing a sender secret, the index value uniquely associated with the key pair, the index value utilized for key retrieval and known only to the sender.

4. The method of claim 1 wherein the key pair is a set of at least one key pair, each key pair associated with a validity field.

5. The method of claim 4 wherein encrypting the electronic message includes i) using a first key pair from the set of at least one key pair to encrypt a first electronic message, the first key pair associated with a valid first validity field; and ii) in an event the first validity field is not valid with respect to a second electronic message, using a second key pair from the set of at least one key pair to encrypt the second electronic message, the second key pair associated with a valid second validity field.

6. The method of claim 1 wherein the ad hoc public key and private key asymmetric key pair is an ad hoc symmetric key.

7. A method implemented in a processor system for a receiver to decrypt an encrypted electronic message received from a sender, comprising the steps of:
    authenticating the receiver to the sender;
    deriving an index value that is uniquely associated with an ad hoc public key and private key asymmetric key pair, the key pair uniquely associated with both the sender and the receiver;
    retrieving an encrypted private key from a key server by utilizing the index value, the private key known only to the sender; and
    decrypting the encrypted electronic message by utilizing the encrypted private key.

8. The method of claim 7 wherein the decrypting step comprises the steps of:
    obtaining an unencrypted private key from the encrypted private key by utilizing a sender secret; and
    decrypting the encrypted electronic message by utilizing the unencrypted private key.

9. The method of claim 7 wherein the index value is known only to the sender.

10. The method of claim 9 wherein the deriving step comprises the steps of:
    obtaining an identity value by utilizing at least a unique identification for the sender and a unique identification for the receiver; and
    computing from the identity value an index value by utilizing a sender secret, the index value uniquely associated with an ad hoc public key and private key asymmetric key pair, the key pair uniquely associated with both the sender and the receiver, and the index value known only to the sender.

11. The method of claim 7 wherein the electronic message is an electronic mail message.

12. The method of claim 7 wherein the key pair is a set of at least one key pair, each key pair associated with a validity field, and the encrypted private key is selected from the set based on the validity field associated with the encrypted private key.

13. The method of claim 7 wherein the ad hoc public key and private key asymmetric key pair is an ad hoc symmetric key.

14. A processor system for a sender to encrypt an electronic message prior to sending to a receiver, comprising:
- means for generating an ad hoc public key and private key asymmetric key pair that is uniquely associated with both the sender and the receiver;
- means for encrypting the private key, the private key known only to the sender;
- means for creating an index value that is uniquely associated with the key pair and both the sender and the receiver, the index value utilized for key retrieval;
- means for storing in a key server at least the encrypted private key together with the associated index value; and
- means for encrypting the electronic message by utilizing the public key.

15. The system of claim 14 wherein the key pair is a set of at least one key pair, each key pair associated with a validity field.

16. The system of claim 15 wherein means for encrypting the electronic message includes i) means for using a first key pair from the set of at least one key pair to encrypt a first electronic message, the first key pair associated with a valid first validity field; and ii) in an event the first validity field is not valid with respect to a second electronic message, means for using a second key pair from the set of at least one key pair to encrypt the second electronic message, the second key pair associated with a valid second validity field.

17. The system of claim 14 wherein the ad hoc public key and private key asymmetric key pair is an ad hoc symmetric key.

18. A processor system for a receiver to decrypt an encrypted electronic message received from a sender, comprising:
- means for authenticating the receiver to the sender;
- means for deriving an index value that is uniquely associated with an ad hoc public key private key asymmetric key pair, the key pair uniquely associated with both the sender and the receiver;
- means for retrieving an encrypted private key from a key server by utilizing the index value, the private key known only to the sender; and
- means for decrypting the encrypted electronic message by utilizing the encrypted private key.

19. The system of claim 18, wherein the key pair is a set of at least one key pair, each key pair associated with a validity field, and the encrypted private key is selected from the set based on the validity field associated with the encrypted private key.

20. The system of claim 18 wherein the ad hoc public key and private key asymmetric key pair is an ad hoc symmetric key.

* * * * *